United States Patent
Herman et al.

(10) Patent No.: US 10,921,485 B2
(45) Date of Patent: Feb. 16, 2021

(54) ILLUMINATOR OBSTRUCTION DETECTION TO IDENTIFY AN OBSTRUCTION ON AN OPTICAL WINDOW

(71) Applicant: Ford Global Technologies, LLC, Dearborn, MI (US)

(72) Inventors: David Michael Herman, Oak Park, MI (US); Ashwin Arunmozhi, Canton, MI (US); Venkatesh Krishnan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 241 days.

(21) Appl. No.: 16/286,071

(22) Filed: Feb. 26, 2019

(65) Prior Publication Data
US 2020/0271823 A1    Aug. 27, 2020

(51) Int. Cl.
   *G01S 17/04*    (2020.01)
   *G01V 8/20*    (2006.01)
   *B60Q 9/00*    (2006.01)

(52) U.S. Cl.
   CPC .............. *G01V 8/20* (2013.01); *B60Q 9/008* (2013.01)

(58) Field of Classification Search
   CPC .......... G01S 15/04; G01S 13/04; G01S 17/04; B60S 1/485; G01V 8/20; B60Q 9/008
   USPC .............................................. 250/221, 214 R
   See application file for complete search history.

(56) References Cited

U.S. PATENT DOCUMENTS

| 5,923,027 A | 7/1999 | Stam et al. |
| 6,271,512 B1* | 8/2001 | Lewis ................... E05F 15/431 250/221 |
| 6,469,291 B2 | 10/2002 | Bauer et al. |
| 8,147,971 B2 | 4/2012 | Van Herpen |
| 9,245,333 B1 | 1/2016 | Beck et al. |
| 2013/0038736 A1 | 2/2013 | Yamamura |

FOREIGN PATENT DOCUMENTS

JP    2000163688 A    6/2000

OTHER PUBLICATIONS

Dung, et. al., "Demonstration of Low-Complexity LED-to-LED Two-Way Visible Light Communication System", 2016 International Symposium on Computer, Consumer and Control, IEEE Computer Society, pp. 219-219 (4 pages).

(Continued)

*Primary Examiner* — Que Tan Le
(74) *Attorney, Agent, or Firm* — Frank A. MacKenzie; Bejin Bieneman PLC

(57) ABSTRACT

A system includes an optical window, and an illuminator and a first light sensor deployed on a same side of the optical window. The system further includes a second light sensor on another side of the optical window. The system further includes a computer including a processor and memory. The memory includes instructions such that the processor is programmed to identify an obstruction on the optical window upon the first light sensor reporting first data from the illuminator that is above an expected threshold. The expected threshold is based on second data from the second light sensor.

20 Claims, 6 Drawing Sheets

(56) References Cited

OTHER PUBLICATIONS

Kowalczyk, et. al., "Influence of Reverse Bias on the LEDs Properties Used as Photo-Detectors in VLC Systems", XXXVI Symposium on Photonics Applications in Astronomy, Communications, Industry and High-Energy Physics Experiments (2015), retrieved from Internet URL: https://www.spiedigitallibrary.org/conference-proceedings-of-spie (9 pages).

Hiscocks, "Measuring Luminance with a Digital Camera", Syscomp Electronic Design Limited, Sep. 16, 2011 (25 pages).

Kowalczyk, et. al., "Photo-Reception Properties of Common LEDs", 2017 Association of Polish Electrical Engineers, published by Elsevier B.V., Opto-Electronics Review 25 (2017), pp. 222-228 (8 pages).

Incipini, et. al., "Sensing Light with LEDs: Performance Evaluation for IoT Applications", Journal of Imaging 2017, 3, 50 (12 pages).

Wueller, et al., "The Usage of Digital Cameras as Luminance Meters", Digital Photography III, SPIE-IS&T Electronic Imaging (2017), SPIE vol. 6502 (11 pages).

Shuai Li, et. al., "Two-Way Visible Light Communication and Illumination with LEDs", IEEE Transactions on Communications and Networking, published 2016, retrieved from Internet URL: https://ieeexplore.ieee.org/document/7738447 (Abstract only ) (1 page).

vol. 16, Issue 23, retrieved from Internet URL: https://ieeexplore.ieee.org/document/7582461 (Abstract only) (1 page).

\* cited by examiner

ILLUMINATOR OBSTRUCTION DETECTION TO IDENTIFY AN OBSTRUCTION ON AN OPTICAL WINDOW

BACKGROUND

Optical windows or lenses for illuminators in or on vehicles, such as LED lights, may become obstructed by snow, dirt, insect matter, etc. Due to the obstruction, the light from the obstructed illuminator may drop below a level required by vehicle cameras to detect and identify objects. This may result in false positive or false negative detections and reduced time to respond to changing driving conditions. Further, cleaning an optical window and/or lenses when not necessary can be wasteful, e.g., may consume significant and often impractical amounts of electrical energy and/or cleaning fluid.

DETAILED DESCRIPTION

Introduction

Figure 1:
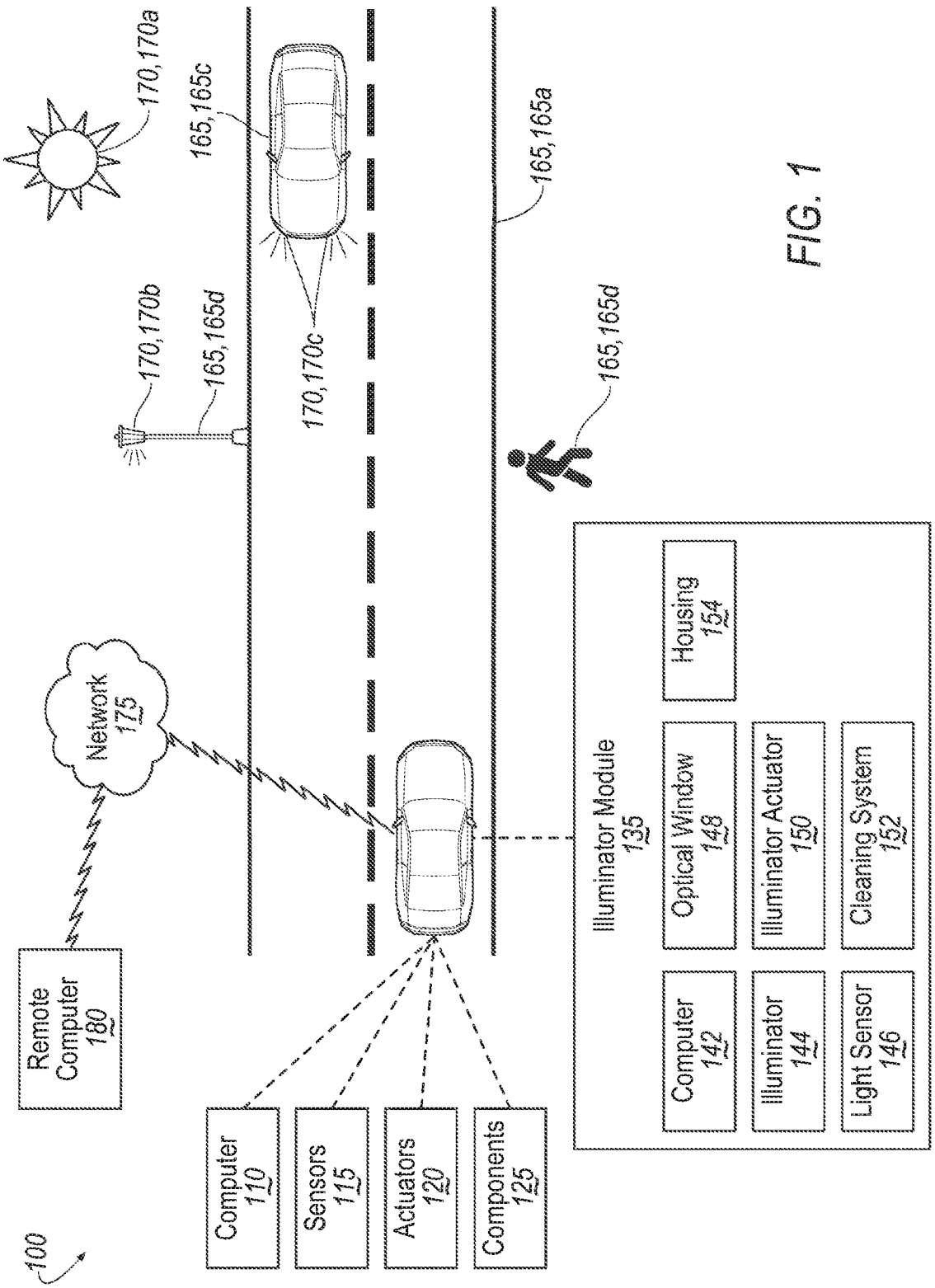
FIG. 1 is a diagram of an example system to detect obstructions of an optical window for illuminators on a vehicle.

Disclosed is a system, comprising: an optical window; an illuminator and a first light sensor deployed on a same side of the optical window; a second light sensor on another side of the optical window; and a computer. The computer includes a processor and memory, the memory including instructions such that the processor is programmed to identify an obstruction on the optical window upon the first light sensor reporting first data from the illuminator that is above an expected threshold, the expected threshold based on second data from the second light sensor.

The processor can be further programmed to: receive third data from the first light sensor when the illuminator is not emitting light; and determine the expected threshold based on the third data.

The first light sensor is one selected from a group of an LED and a photodiode.

The second light sensor can be a camera.

The processor can be further programmed to: receive temperature data specifying a temperature of the first light sensor; and adjust the first data based on the temperature data.

The processor can be further programmed to: receive calibration data from the first light sensor when the optical window is determined not be to be obstructed; and determine the expected threshold based on the calibration data.

The first light sensor can be a photodiode and the first data can specify at least one of a group including a current through the photodiode and a voltage across the photodiode.

The first light sensor can be an LED and the first data can specify at least one of a group including a current through the LED and a voltage across the LED.

The first light sensor and the illuminator can be a same element.

The processor can be further programmed to switch the illuminator into a mode to not emit light; receive third data from the illuminator; switch the illuminator into a mode to emit light; and receive the first data from the illuminator.

Further disclosed is a system, comprising: an optical window on a vehicle; a light sensor deployed on a first side of the optical window; and a computer. The computer includes a processor and memory, the memory including instructions such that the processor is programmed to: determine a threshold based on an estimated intensity of light arriving at a second side of the optical window from a light source; and detect an obstruction on the optical window upon the light sensor reporting first data from the light source that is below the threshold.

The processor can be further programmed to: estimate the intensity of light arriving based on a type and location of the light source on the second side of the optical window.

The processor can be further programmed to: determine the type of the light source based on image data received from a sensor on the second side of the optical window.

The processor can be further programmed to: determine the location of the light source based on image data received from the second side of the optical window.

The processor can be further programmed to: determine the threshold based on an intensity of light received from a sensor on the second side of the optical window.

The processor can be further programmed to: activate an illuminator deployed on the first side of the optical window; and detect the obstruction on the optical window upon the light sensor reporting second data that exceeds first data by a second threshold.

The processor can be further programmed to: determine the second threshold based on an intensity of light received from a sensor on the second side of the optical window.

The sensor on the second side of the optical window can be a camera.

The processor can be further programmed to: estimate an expected intensity of light received from a sensor on the second side of the optical window based on a type and location of an object proximate to the vehicle; and detect the obstruction on the optical window upon the sensor on the second side of the optical window reporting data below the threshold.

The first light sensor can be a photodiode.

Exemplary System Elements

A vehicle can include a light sensor proximate to an illuminator that detects a light level and output data specifying the light level. A light level at a surface is an intensity of light at the surface, which may be specified, for example, in lumens per square meter (lux). The light level may also be referred to as illuminance. Data specifying light levels may be collected both when the illuminator is off or deactivated (i.e., not emitting light) and when the illuminator is activated (i.e., emitting light). The detected light can include light from external light sources and/or light from an illuminator that is reflected from an optical window or lens used to protect the illuminator. In some cases, described below, the illuminator itself can serve as a light sensor. Further, the vehicle can include a camera that detects images that provide additional data to determine a light level. Still further, in some cases, the camera can provide data specifying types and locations of objects and light sources in an environment proximate to the vehicle. A type of object or light source is defined herein as a classification or category of objects or light sources having common features. Non-limiting examples of a type of object include vehicles, people, bicycles, etc. Non-limiting examples of a type of light source include the sun, the moon, a street lamp, a lighted building, a lighted sign, a lighted stadium, a bioluminescent insect etc.

A vehicle computer can be programmed to detect an obstruction on the optical window of the illuminator based on a determined light level.

FIG. 1 is a block diagram of an example system 100 for detecting obstructions on vehicle illuminators 144. The system 100 includes a vehicle 105, which is a land vehicle such as a car, truck, motorcycle, etc. The vehicle 105 can include a vehicle computer 110, sensors 115, actuators 120 to actuate various vehicle components 125, and one or more illuminator modules 135. Via a network 175, the vehicle computer 110 may communicate with a remote computer 180.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate a vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via a vehicle 105 communications bus as described further below, more than one processor, e.g., included in electronic control units (ECUs) or the like included in the vehicle 105 for monitoring and/or controlling various vehicle components 125, e.g., a powertrain controller, a brake controller, a steering controller, a computer 142 in the illuminator module 135, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages from the various devices, e.g., sensors 115, actuators 120, the illuminator module 135, a human machine interface (HMI), etc. Alternatively or additionally, in cases where the vehicle computer 110 actually comprises a plurality of devices, the vehicle 105 communications network may be used for communications between devices represented as the vehicle computer 110 in this disclosure. Further, as mentioned below, various controllers and/or sensors 115 may provide data to the vehicle computer 110 via the vehicle communication network.

Vehicle sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 165c, etc., relative to the location of the vehicle 105. The sensors 115 may further alternatively or additionally, for example, include camera sensor(s) 115, e.g. front view, side view, etc., providing images from an area surrounding the vehicle 105. Camera sensors 115 may also be referred to herein as cameras 115.

The vehicle 105 actuators 120 are implemented via circuits, chips, or other electronic and or mechanical components that can actuate various vehicle 105 subsystems in accordance with appropriate control signals as is known. The actuators 120 may be used to control vehicle components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of vehicle components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

The illuminator module 135 includes a computer 142. The computer 142 is programmed to activate (switch into a light emitting mode) illuminators 144 and to receive data from one or more light sensors 146. The illuminators 144 are light sources, and may be, for example, light emitting diodes (LEDs) operated in an active (light emitting) mode. The light sensors 146 may be photodiodes. Alternatively, one or more light sensors 146 may be LEDs configured in a light-detecting mode to sense light. In some cases, an illuminator 144 may be switched between a light emitting mode and a light-detecting mode. In another case, by monitoring a current-voltage (IV) curve of an illuminator 144, the illuminator 144 can be used simultaneously to emit light and detect received light and can therefore be understood to operate as both an illuminator 144 and a light sensor 146 simultaneously.

The illuminator module 135 includes one or more optical windows 148. An optical window 148 is defined herein as a substantially transparent covering for an optical system designed to maximize transmission in a specified wavelength range used to protect optical components such as illuminators 144 and light sensors 146 from an outside environment. The optical window 148 may be or include a lens used to focus or diverge the light that passes through the optical window 148.

The illuminator module 135 may further include a cleaning system 150. The cleaning system 150 is arranged to clean the optical window 148 and may include pumps and nozzles to spray the optical windows 148 with cleaning fluid or with air, and wipers to remove debris from the optical windows 148.

The computer 142 may be programmed to instruct the cleaning system 150 to clean an optical window 148 upon determining that the optical window 148 is obstructed by debris. In an example, the computer 142 may command the cleaning system 150 to clean the optical window 148 based on instructions received from the vehicle computer 110.

Illuminator actuators 152 typically include electronic and electromechanical components configured to actuate the illuminators 144 and light sensors 146 included in the illuminator module 135. For example, the illuminator actuator 152 can include electronic components arranged in a circuit to turn on and off the illuminators 144. The illuminator actuator 152 can further include electronic components arranged to bias the light sensors 146 to detect received light and provide an output signal to the computer 142. Still further, the illuminator actuator 152 may include electronic components configured to switch one or more illuminators 144 between an active mode for emitting light, and a light-detecting mode for sensing light. Still further, the illuminator actuator 152 may include electronic components configured to sense a current/voltage (IV) curve of an illuminator 144 while it is emitting light and provide one or more signals to the computer 142 representing the current and voltage of the illuminator 144.

In some cases, the illuminator module 135 may include a housing 154. The housing 154, together with the optical window 148 may form a cavity and the illuminator(s) 144 and light sensor(s) 146 may be supported inside the cavity. The housing 154 and optical window 148 can, in this case, protect the illuminator(s) 144 and light sensor(s) 146 from an outside environment. Additionally, the housing 154 can block light from the illuminator 144 directly illuminating other sensors 115, such as a camera 115.

One or more objects 165 may be present in the environment proximate to the vehicle 105. For example, the environment may include stationary objects 165 such as roads 165a and lampposts 165b. Objects 165 may further include second vehicles 165c, pedestrians 165d, animals, etc.

The environment proximate to the vehicle 105 may further include one or more external light sources 170. External light sources 170 proximate to the vehicle 105 are defined herein as light sources 170 which may influence light measurements performed by the vehicle 105 sensors 115 and light sensors 146. For example, the sun 170a may be present. The sun 170a may influence light measurements performed by the vehicle 105 and is considered to be proximate to the vehicle 105 herein.

Further, the environment proximate to the vehicle 105 may include stationary external light sources 170 such as streetlamps 170b, lighted buildings, bridges, stadiums, etc. Still further, the environment proximate to the vehicle 105 may include mobile external light sources 170 such as headlights 170c on a second vehicle 165c.

External light sources 170 in the environment proximate to the vehicle 105 may influence light measurements performed by the vehicle 105 sensors (e.g. cameras) 115 and light sensors 146. For example, during the day, light from the sun 170a may be received by the camera 115 and the light sensor 146. As described below, data from the camera 115 and the light sensor 146 may then be compared to determine a degree of obstruction of an optical window 148 blocking light to the light sensor 146.

At night, when light from the sun 170a is reduced or not present, light from external light sources 170 such as streetlamps 170b may influence light measurements. Further, light from external light sources 170 such as headlights 170c from a second vehicle 165c may influence light measurements. As described below, the vehicle computer 110 may be programmed to identify types and locations of objects 165 and external light sources 170. The vehicle computer 110 may further be programmed to estimate light levels that may be received by the camera 115 and light sensor 146 from external light sources 170.

The network 175 represents one or more mechanisms by which a vehicle computer 110 may communicate with the remote computer 180. Accordingly, the network 175 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short-Range Communications (DSRC), etc.), local area networks (LAN) and/or wide area networks (WAN), including the Internet, providing data communication services.

The remote computer 180 can be a conventional computing device, i.e., including one or more processors and one or more memories, programmed to provide operations such as disclosed herein. Further, the remote computer 180 can be accessed via the network 175, e.g., the Internet or some other wide area network. The remote computer 180 may provide data such as map data to the vehicle computer 110.

Figure 2:
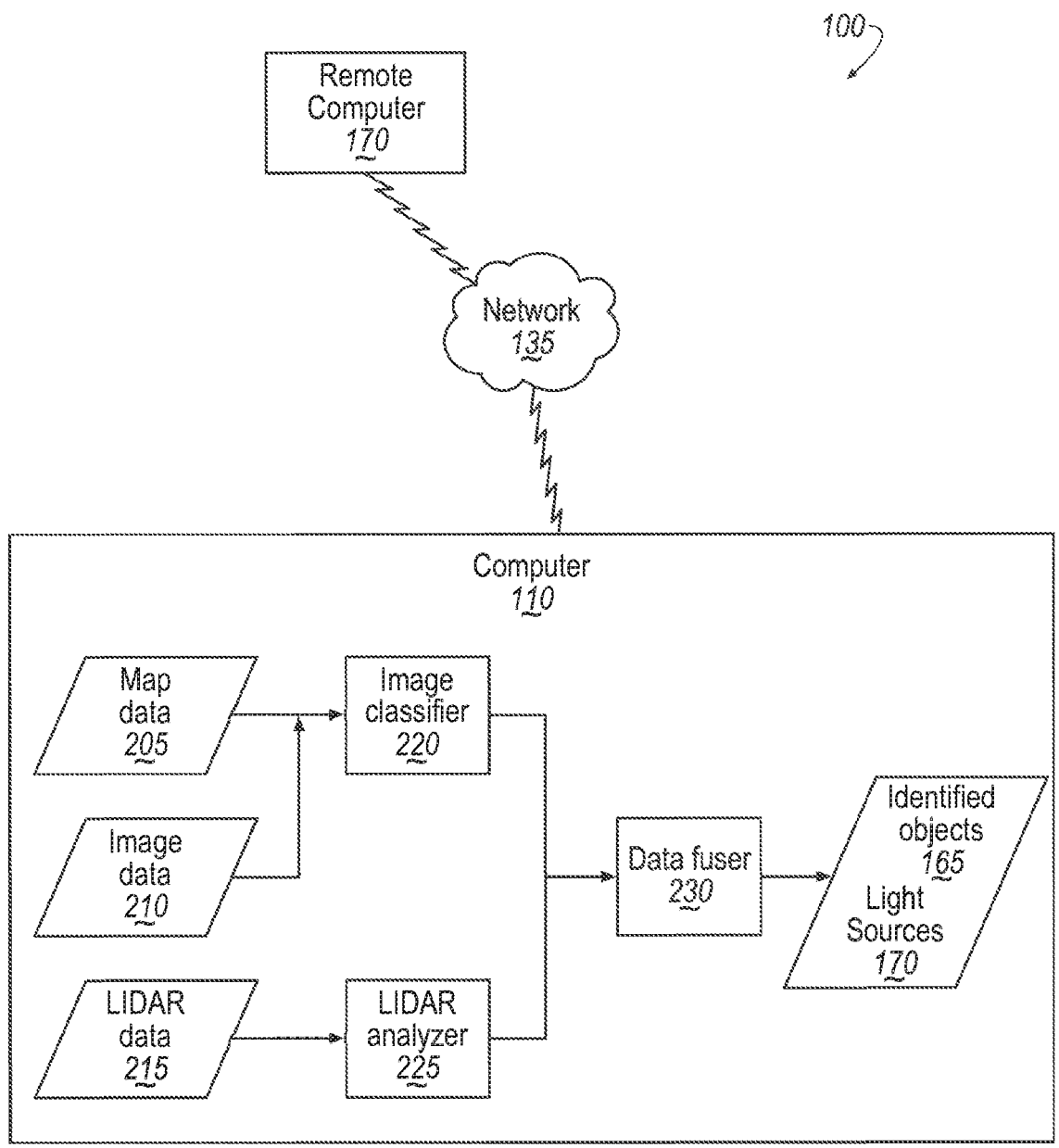
FIG. 2 is a block diagram illustrating processing in a vehicle computer.

FIG. 2 is a block diagram illustrating processing in the vehicle computer 110.

The vehicle computer 110 can include a memory or other storage with map data 205 describing an area proximate to the vehicle 105. For example, the area proximate to the vehicle 105 may be an area within a fixed distance, e.g., 500 meters, of the vehicle 105. As an example, the map data 205 could be received and/or periodically updated from the remote computer 180 or another computer. The map data 205 typically includes geo-coordinates defining objects 165 which are fixed or stationary such as roads 165a, lampposts 165b, buildings, etc. The map data 205 may further include external light sources 170 that are stationary such as streetlamps 170b, lighted buildings, bridges, stadiums, etc. Yet further, the map data 205 may include a light intensity from external light sources 170 at locations within the environment proximate to the vehicle 105 under different conditions, e.g., at night when the streetlamps 170b are turned on. Still further, the map data 205 may include a type of lamp and/or a spectral power distribution of the external lamp sources 170.

Further, the vehicle computer 110 can receive various data from the vehicle sensors 115 such as image data 210 and LIDAR data 215. Image data 210 is digital image data, e.g., comprising pixels with intensity and color values, can be acquired by camera sensors 115. LIDAR data 215 typically includes conventional LIDAR point cloud data acquired by lidar sensors 115, i.e., including data describing points in three dimensions, that is, each point representing a location of a surface of mobile objects 165 such as pedestrians and second vehicles 165c proximate to the vehicle 105.

Map data 205 and image data 210 can be provided to a classifier 220. The classifier 220 comprises programming to utilize one or more conventional image classification techniques. For example, the classifier can use a machine learning technique in which images 210 of various objects 165, external light sources 170 and physical features thereof, can be provided to a machine learning program for training the classifier 220. Training images 210 can be provided from images gathered by vehicles 105, or other sources. Once trained, the classifier 220 can accept as input an image 210 and then provide as output, for the area proximate to the vehicle 105 in the image 210, an indication of one or more objects 165 and the type and location of one or more external light sources 170.

Map data 205 is used to specify the environment proximate to the vehicle 105 in an image 210. For example, map data 205 may specify geo-coordinates or the like for various physical features of infrastructure objects 165 proximate to the vehicle 105. Programming of the classifier 220 or otherwise included in the vehicle computer 110 can determine the environment proximate to the vehicle 105 in an image 210 according to geo-coordinates specified in map data 205. That is, geo-coordinates in map data 205 can be mapped or associated to Cartesian or polar coordinates in an image sensor 115 field-of-view. The classifier 220 can identify coordinates in an image 210 representing the environment proximate to the vehicle 105 based on geo-coordinates in map data 205 e.g., a field of view of one or more sensors 115 or a subset thereof, e.g., an area of a road 165*a*, a lamppost 165*b*, etc. The region of interest can then be analyzed by the classifier 220 according to conventional image classification and/or object recognition techniques. Accordingly, the classifier 220 can output identification of one or more mobile objects 165 with respective geo-coordinates, i.e., according to map data 205, of each identified mobile object 165.

Data fuser 230 comprises further programming in the vehicle computer 110. The data fuser includes programming to accept as input a first set of one or more objects 165 and external light sources 170 identified by the image classifier 220 and a second set of one or more objects 165 and external light sources 170 identified by the lidar analyzer 225. The data fuser 230 can output a third set of one or more identified objects 165 and identified external light sources 170. The set of identified objects 165 and external light sources 170 could be provided in the form of a list, a table, or the like, where each object 165 and external light source 170 in the set is identified by an identifier and/or description, e.g., "pedestrian (or person)" "vehicle," "streetlamp," etc., along with a set of geo-coordinates identifying a location or locations of the respective object 165 or external light source 170. For example, the geo-coordinates could specify a center or reference point, e.g., for an object 165 or external light source 170.

Further, object features can be determined from sensor 115 data once an object 165 is identified. For example, a second vehicle 165*c* trajectory can be determined, e.g., using conventional techniques to track the second vehicle 165*c* according to LIDAR sensor 115 data. Alternatively or additionally, as noted above, an object 165 or external light source 170 location can be determined, e.g., with reference to map data 205.

Identified objects 165 or external light sources 170 can be determined by the following processing by the data fuser 230. Specifically, the data fuser 230 can compare each object 165 or external light source 170 identified in the first set to each object 165 or external light source 170 identified in the second set to determine whether a combined confidence in the object 165 or external light source 170 identified by image data 210 and lidar data 215 warrants a conclusion that the object 165 or external light source 170 can be identified. For example, conventional image classification and lidar data analysis techniques may be used in the image classifier 220 and lidar analyzer 225, respectively, to assign a confidence level, e.g., a number between or including zero and one, to each predicted object 165. When a combination of the confidences of object 165 or external light source 170 predictions from the image classifier 220 and the lidar analyzer 225 meets or exceeds a threshold, then the object 165 or external light source 170 may be included in the feature conditions 235 output from the data fuser 230. In one example, the object 165 or external light source may be included in the conditions 235 if either the image classifier 220 or the lidar analyzer 225 predict the object 165 or external light source 170 with a confidence above a predetermined threshold, e.g., 0.9 or 90%.

The location and direction of light coming from the sun 170*a* relative to sensors 115 and light sensors 146 on the vehicle 105 can be determined conventionally, e.g. based on calendar and time-of-day data, together with the geo-coordinates of the vehicle 105. For example, based on the time-of-day and calendar data, the vehicle computer 110 can determine a position of the sun 170*a* in the sky, e.g., by storing and/or consulting conventional tables or the like that, for a specified latitude and longitude, and specify an azimuth and elevation of the sun relative to the location of the vehicle 105. The vehicle computer 110 can further, based on geo-coordinates of the vehicle 105 and the direction of travel, determine whether the camera(s) 115 and light sensor(s) 146 are facing in a direction to receive light from the sun 170*a*.

Figure 3A:
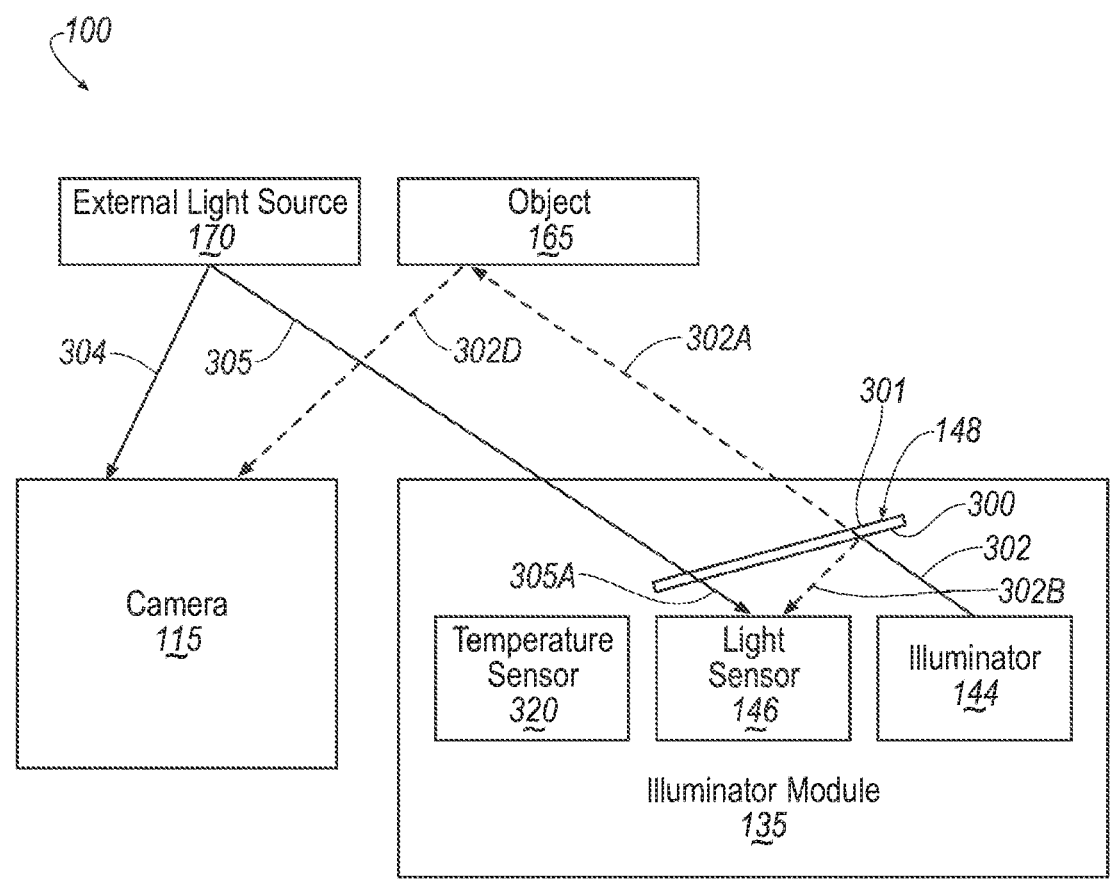
FIG. 3A is a block diagram of an example system for detecting an obstruction of an optical window.
Figure 3B:
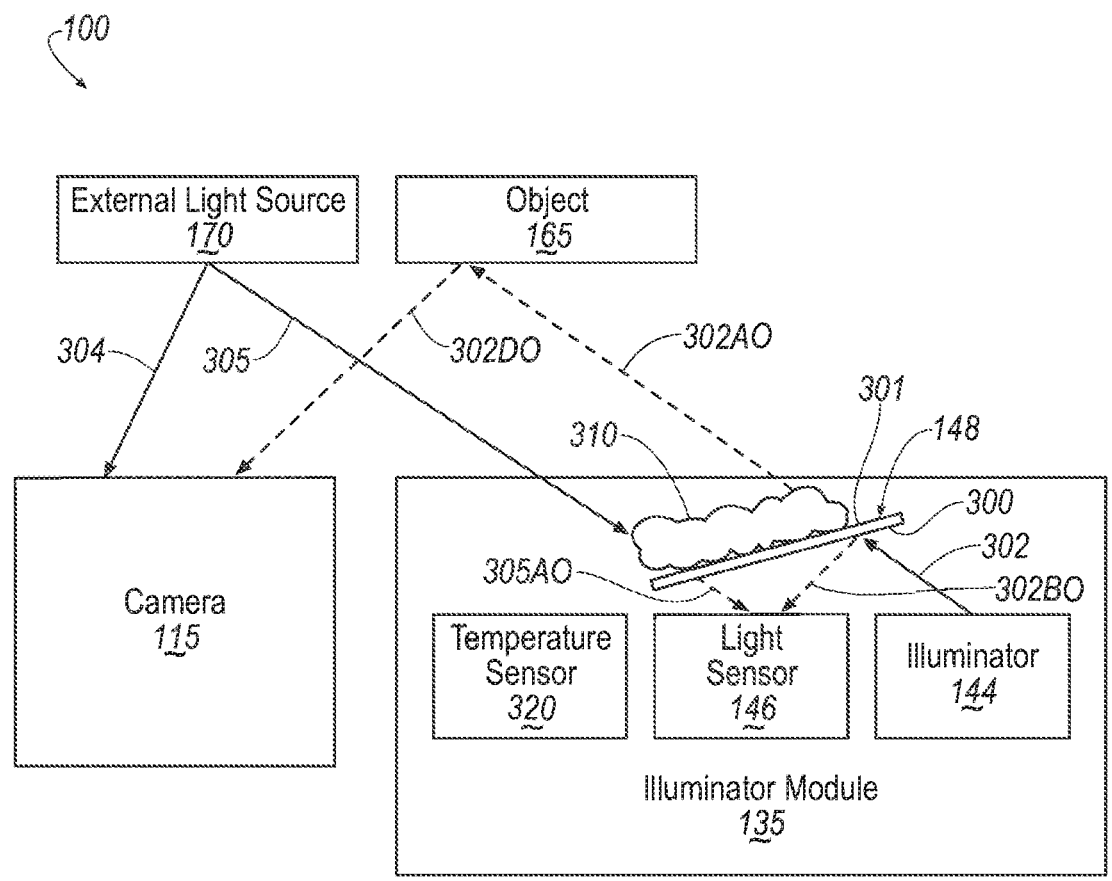
FIG. 3B is a block diagram of the example system of FIG. 3A, including an example obstruction.

FIGS. 3A and 3B illustrate respective examples of the system 100 for detecting an obstruction 310 on an optical window 148. An illuminator module 135 includes an illuminator 144, a light sensor 146 and an optical window 148. The optical window 148 has a first side 300 and a second side 301. The illuminator 144 and the light sensor 146 are deployed on the first side 300 of the optical window 148, such that the optical window 148 can shield both the illuminator 144 and the light source 146 from elements such as precipitation, dirt, etc. from an external environment. A camera 115 arranged on the second side 301 of the optical window 148, such that light from the illuminator 144 passes through the optical window 148 to reach the camera 115. The illuminator module 135 may further include a temperature sensor 320 for detecting a temperature of the light sensor 146.

FIG. 3A illustrates the system 100 without an obstruction 310 on the optical window 148. An external light source 170 is located external to the illuminator module 135, on the second side 301 of the optical window 148. The external light source 170 may be, for example, a streetlamp 170*b*, and emits light 304 in a direction of the camera 115 and light 305 in a direction toward the first side 301 of the optical window 148. A light portion 305A of the light 305 passes through the optical window 148 to the sensor 146. In an example, the camera 115 and light sensor 146 are mounted on a same side of a vehicle 105, facing in a same direction, such that an intensity of the emitted light 304 and 305 may be substantially the same.

In a case that the illuminator 148 is activated, it emits light 302 in a direction of the optical window 148. A light portion 302A of the light 302 passes through the optical window 148 to the object 165. A second light portion 302B of the light 302 reflects off the optical window 148 in a direction of the light sensor 146. The light portion 302A continues to the object 165 where a light portion 302C is reflected in a direction to be received by the camera 115.

FIG. 3B illustrates the system 100 with an obstruction 310 on the optical window 148. In this case, a light portion 305AO of the light 305 from the external light source 170 passes through the obstruction 310 and the optical window 148 to reach the light sensor 146.

In the case that the illuminator 144 is activated, the illuminator 144 emits light 302 in a direction to pass through the optical window 148 toward the object 165. A light portion 302AO passes through the optical window 148 and obstruction 310 and reaches the object 165. A light portion 302BO is reflected toward the light sensor 146. A light portion 302CO of the light is reflected by the object 165 toward the camera 115.

The obstruction 310 may impact, i.e., reduce, the intensity of the light 302AO, 305AO passing through the obstruction 310 and may further change the intensity of the light 302BO reflected off the optical window 148. Typically, the intensity of the reflected light 302BO would be increased due to the obstruction 310. However, in some cases, for example with a nearly transparent obstruction 310, the intensity of the reflected light 302BO may be decreased. Because of the obstruction 310, the portion of light 305AO passing through the obstruction 310 and optical window 148 may be reduced in intensity relative to the portion of light 305A that passes through the optical window 148 without obstruction. Similarly, the portion 302AO may be reduced in intensity relative to the light portion 302A and the light portion 302CO may be reduced in intensity relative to the light portion 302C. Further, because of the obstruction 310, the light portion 302BO of the light 302 reflected off the optical window 148 toward the light sensor 146 may be increased relative to the light portion 302B reflected without an obstruction 310.

The differences in light intensity between 302A and 302AO, 302B and 302BO, 302C and 302CO may be used, as described below, to detect the obstruction 310 on the optical window 148.

Figure 4:
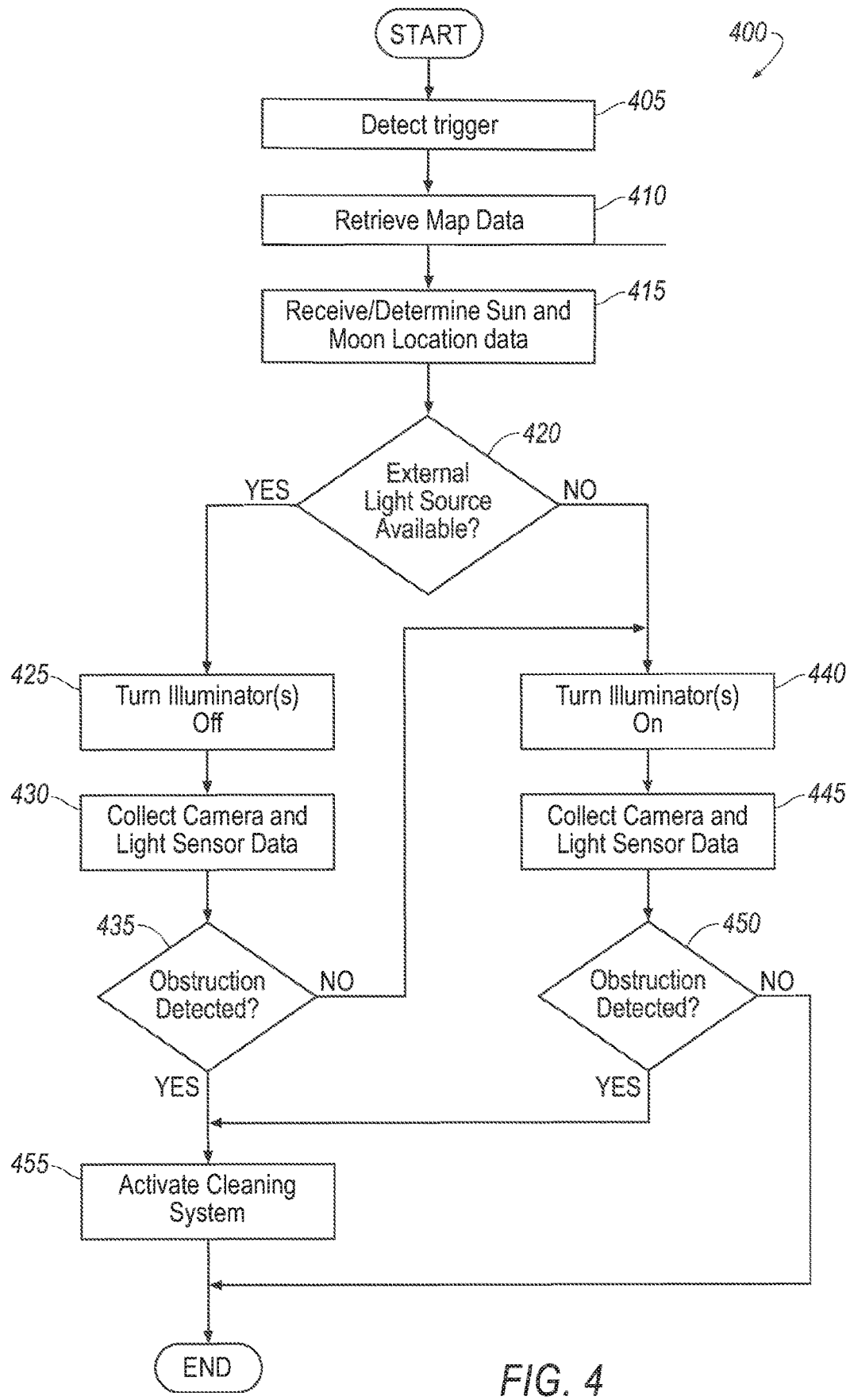
FIG. 4 is a flowchart of an exemplary process for detecting an obstruction of an optical window for an illuminator.

FIG. 4 is a flow diagram of an example process 400 for detecting an obstruction 310 on an optical window 148 covering an illuminator 144. The process 400 begins in a block 405.

In the block 405, the vehicle computer 110 detects a trigger event to initiate obstruction detection, i.e., the computer 110 receives a datum or data according to which the computer 110 is programmed to, upon receipt of the datum or data, initiate obstruction detection. The trigger event may be the occurrence of a periodic signal, or detection of an event that occurred within the vehicle 105 or the environment of the vehicle 105.

Non-limiting examples of events to trigger an obstruction detection process include: starting the vehicle; a period of time elapsing during which the vehicle 105 is running, for example, a trigger event could be detected every 15 minutes; mileage traveled by the vehicle, for example a trigger event could be detected every 30 miles; and detecting that an image quality of a camera 115 or LIDAR 115 drops below a threshold. Upon detecting the trigger event, the process continues in a block 410.

In the block 410, the vehicle computer 110 is programmed to retrieve and/or update map data 205. For example, the vehicle computer 110 may retrieve map data 205 from data storage on the vehicle 105 or from the remote computer 180. The block 410 may be omitted, for example, if the vehicle computer 110 already has current map data 205, e.g., map data retrieved within a specified period of time, e.g, 30 minutes, or, as another example, if the vehicle 105 has moved less than a specified distance, e.g., 15 miles, from a last time that map data 205 was retrieved. In another example, the block 410 may run concurrently with other blocks of the process 400 and the computer 110 may receive streamed data on a minute-by-minute or second-by-second basis. The process continues in a block 415.

In the block 415, the vehicle computer 110 is programmed to determine the presence, location, and direction of light from the sun 170a based on time-of-day and calendar data as described above. The vehicle computer 110 can further, based on geo-coordinates of the vehicle 105 and the direction of travel, determine whether the camera(s) 115 and light sensor(s) 146 are facing in a direction to receive light from the sun 170a. The process 400 continues in a block 420.

In the block 420, the vehicle computer 110 is programmed to determine, based on the map data 205, location of the sun 170a, and the time-of-day, whether there is sufficient light from external sources for the vehicle computer 110 to perform an obstruction detection. Sufficient light to perform an obstruction detection may be, for example, a light intensity from external light sources 170, at a location of the vehicle 105 in a direction facing the camera(s) 115 and light sensor(s) 146 greater than a predetermined light intensity threshold.

The predetermined light intensity threshold may be, for example, determined empirically. As a first example, it may be determined, e.g., via empirical tests, that, at a minimum, the computer 110 typically can detect an obstruction 310 that reduces the intensity of light received by the light sensor 146 by a minimum percentage, for example, 10%. It may further be determined that, to have confidence in a measurement, a minimum reduction in intensity, for example two lux, is required. In this case, the predetermined threshold to have sufficient light to perform an obstruction detection may be 20 lux, such that a 10% reduction of light intensity received by the light sensor 146 results in a two lux reduction.

As another example, the system 100 may compare an intensity of light received by the camera 115 with the intensity of light received by light sensor 146 based on light from the external light source 170. In this case, it may be determined, for the obstruction 310 that reduces light by a minimum percentage, that, due to variations in performance of the camera 115 and the light sensor 146, a minimum difference between the detected light intensity at the camera 115 and the light sensor 146 (due to the obstruction 310) must be at least 1.5 lux. In this case, the predetermined light intensity threshold may be set to 15 lux, such that a 10% reduction results in a 1.5 lux reduction in light intensity received by the light sensor 146.

For example, if, based on the time of day, there is light from the sun 170a, the vehicle computer 110 may determine that there is an external light source 170 (i.e., the sun 170a) available to perform an obstruction detection. During daylight, even on dark days, intensity of the light of the sun 170a on the surface of the earth is typically greater than 100 lux, which can be determined to be greater than the predetermined light intensity threshold to detection an obstruction 310.

As another example, in a case that it is nighttime, and the vehicle 105 is on a street with streetlamps 170b, the vehicle computer 110 may be programmed to determine whether light from the streetlamps 170b at a location of the vehicle 105 in a direction facing the camera(s) 115 and light sensor(s) (146) is greater than the predetermined light intensity threshold.

In one example, the map data 210 may include data specifying, based on collected data, an intensity of light from external light sources 170 at locations, i.e., at different geo-coordinates, along streets. In this case, the vehicle computer 110 may determine, based on the location of the vehicle 105, whether the light intensity from external light source(s) 170 is greater than or equal to the predetermined light intensity threshold for performing an obstruction detection.

In another example, the vehicle computer 110 may maintain a table, such as Table 1 below, of an intensity of different types of external light sources 170 such as streetlamps 170a.

TABLE 1

| Type of Light Source | Intensity at Source (lumens) |
|---|---|
| Low-pressure Sodium | 72,000 |
| High-pressure Sodium | 90,000 |
| Mercury Vapor | 80,000 |
| Light Emitting Diode (LED) | 120,000 |

Based on Table 1, and the map data 210, the vehicle computer 110 may be programmed to determine whether the vehicle 105 is within range of an external light source 170 to perform an obstruction detection.

For example, a predetermined intensity of light at the vehicle 105 for detecting an obstruction may be 20 lux (lumen/square meter). There may be a single low-pressure sodium streetlamp 170b with a light intensity of 72,000 lumens. The light intensity at the location of the vehicle 105 can be calculated according to equation 1 below:

$$I = \frac{S}{4\pi r^2} \quad \text{Eq. 1}$$

where I is the light intensity in lux at the vehicle 105, S in the intensity of the streetlamp 170b in lumens, and r is the distance from the streetlamp 170b to the vehicle 105. Based on equation 1, in a case that the vehicle 105 is 20 meters from the streetlamp 170b, the light intensity I at the vehicle 105 can be calculated to be 14.3 lux. In the case that the predetermined threshold for detecting an obstruction is 20 lux, the light from the streetlamp 170b would not be greater than the predetermined threshold, and accordingly not sufficient to detect an obstruction 310. In the case of multiple streetlamps 170b proximate to the vehicle 105, the light intensity at the vehicle 105 for each streetlamp 170b may be calculated as described above; the light intensities for each streetlamp 170b at the vehicle 105 may be added together to determine if the total light intensity I at the vehicle 105 is sufficient to detect an obstruction. In this case, the multiple streetlamps 170b may include streetlamps 170b that are not in view of the camera 115, but contribute to the light intensity I at the vehicle 105. For example, the computer 110 may include these streetlamps 170b based on map data indicating the location of these streetlamps 170b.

In some cases, the computer 110 may further be programmed to consider a quantum efficiency (QE) of the camera 115 and/or light sensor 146 in determining whether the intensity of light available at the vehicle 105 is greater than the predetermined light intensity threshold. A quantum efficiency of, for example, of a light sensor 146 is a measure of the light sensor 146 sensitivity to light at different wavelengths. Due to reduced conversion efficiency of the light sensor 146 at some wavelengths, a lamp with an intensity of x lumens at the source, may be perceived by the light sensor 146 as having an intensity a×(x) where a is an efficiency factor due to quantum efficiency over the spectrum of the irradiated light from the source.

In an example, the computer 110 may maintain, for each type of lamp, an efficiency factor $a_{sensor}$ for each of the light sensor 146 and an efficiency factor $a_{camera}$ for each camera 115. This table may be generated empirically for a type of light source 170, by irradiating each of the light sensor 146 and the camera 115 respectively with an example of the type of light source with a known light intensity, and measuring the light intensity as detected by light sensor 146 and the camera 115. Based on the measurements, the efficiency factors $a_{sensor}$ for each of the light sensor 146 and an efficiency factor $a_{camera}$ can be determined according to equation 2 below.

$$a_{sensing\ device} = \frac{I_{source}}{I_{received}} \quad \text{Eq. 2}$$

where:
$a_{sensing\_device}$ is the efficiency factor of the sensing device,
$I_{source}$ is the light intensity of the source, and
$I_{received}$ is the light intensity sensed by the sensing device.
The computer 110 can then apply the table to account for conversion efficiency of the camera 115 and the light sensor 146 for different types of lamps when determining whether light from the streetlamps 170b at a location of the vehicle 105 in a direction facing the camera(s) 115 and light sensor(s) (146) is greater than the predetermined light intensity threshold.

In the case that, based on the external light sources 170, a light intensity at the vehicle 105 is greater than the predetermined light intensity threshold, the process 400 continues in a block 425. Otherwise, the process 400 continues in a block 440.

In the block 425, the vehicle computer 110 is programmed to maintain or switch the illuminator 144 to an inactive state, such that the illuminator 144 is not emitting light. The process 400 continues in a block 430.

In the block 430, the vehicle computer 110 is programmed to receive light intensity data from the camera 115 and from the light sensor 146. The light intensity data from the camera 115 specifies an intensity of the light received from the external light source 170 by the camera 115. The light intensity data from the light sensor 146 specifies an intensity of the light received from the external light source 170 by the light sensor 146. The process 400 continues in a block 435.

In the block 435, the vehicle computer 110 is programmed to detect whether the optical window 148 is obstructed based on the light intensity data from the camera 115 and the light intensity data from the light sensor 146. For example, and referring to FIGS. 3A and 3B, the vehicle computer 110 may be programmed to determine that the light intensity of light 305A received by the light sensor 146 from the external light source 170 is above a threshold. The vehicle computer 110 may be programmed to determine the threshold based on the light intensity of the light 304 received by the camera 115. For example, the threshold may be set to be a fixed percentage, e.g., 85%, of the intensity of the light 304 received by the camera 115.

In a digital camera, for example, the camera 115, each pixel of a captured image has a value that represents a light intensity at that point. The amount of exposure (the brightness of an image) is proportional to the number of electrons that are released by photons of light impinging on the sensor. Therefore, the brightness is proportional to the light intensity (in lux) times the exposure time, so the brightness is in lux-seconds. In an example, the luminance of the scene from an external light source 170 may be calculated from equation 2, as follows:

$$L_s = \frac{f_s^2 N_d}{K_c t S} \qquad \text{Eq. 2}$$

where $N_d$ is a digital number (value) of the pixel in the image, $K_c$ is a calibration constant for the camera 115, t is the exposure time, in seconds, $f_s$ is the aperture number (f-stop), S is the ISO sensitivity of the file and $L_s$ is the luminance of the scene, in candela/meter squared (m²). Based on the luminance, the vehicle computer 110 may further be programmed to determine the intensity (in lux) of the light 304 received by the camera 115.

This can be done, for example, by mathematical calibration through image processing to understand the pixel intensity information of the image captured based, for example, on digital values of pixels and image analysis. The camera 115 can take a photograph of a source of known luminance and thereby obtain a conversion factor that links luminance (in candela per square meter) to the digital value of a pixel in the image. Additionally, some cameras 115 have a light meter that can supply light intensity measurements at the camera 115 that can be used for calibration.

A light sensor 146 such as a photodiode or an LED biased in a mode to detect light intensity generates a current that increases with increasing intensity light received by the light sensor 146. This generally requires reverse biasing the light sensor 146 as is known. This example is not intended to be limiting. Other methods are possible for biasing the light sensor 146.

In this mode, when applying a reverse bias to the light sensor 146, a current $I_{photodiode}$ through the light sensors 146 can be calculated according to equation 3 as follows:

$$I_{photodiode} = I_{dark} + I_{light} \qquad \text{Eq. 3}$$

The current $I_{dark}$ is a small (typically less than one nanoamp) current that flows when the light sensor 146 is operating in the dark. $I_{light}$ is a current that flows through the light sensor 146 due to illumination, e.g., when light 305A, is applied to the light sensor 146.

The current $I_{dark}$ for a light sensor 146 generally varies with temperature. Typically, the current $I_{dark}$ will double in value for every 10° C. increase in temperature. The computer 110 can be programmed to determine the current $I_{dark}$ based on a specification for the current $I_{dark}$ at a specified temperature (for example, at 25° C.), and adjust the current $I_{dark}$ based on the actual temperature of the light sensor 146. That is, based on a known (through measurement or specification) current $I_{darkT1}$ at a first temperature $T_1$, the dark current $I_{darkT2}$ at a second temperature $T_2$ can be calculated based on equation 4, as follows:

$$I_{darkT1} = I_{darkT2} 2^{\left(\frac{T_2 - T_1}{10}\right)} \qquad \text{Eq. 4}$$

In practice, and as shown in FIGS. 3A and 3B, the illuminator module 135 may include a temperature sensor 320. The computer 110 can be programmed to receive temperature data from the temperature sensor 310 and calculate the dark current $I_{dark}$ based on the data.

The current $I_{light}$ is substantially proportional to the intensity of light 305A (in lux) applied to the light sensor 146 over a linear range which can extend over four or more orders of magnitude. Table 2, below, shows an example relationship between intensity of light 305A and current through the light sensor 146.

TABLE 2

| Light Intensity (lux) | $I_{light}$ due to Illumination (microamperes) |
|---|---|
| 2 | .1 |
| 20 | 1 |
| 200 | 10 |
| 2000 | 100 |

In an example, a measurement circuit in the illuminator module 135 may measure the current through the light sensor 146 $I_{photodiode}$ while it is illuminated by the external light source 170. Data specifying an amount of current $I_{photodiode}$ through the light sensor 146 may be supplied to the vehicle computer 110. To compensate for the dark current $I_{dark}$, the computer 110 can then calculate $I_{light} = I_{photodiode} - I_{dark}$. Based on the current $I_{light}$, and the known relationship between the intensity of the light 305A received by the light sensor 146 and the current $I_{light}$, the vehicle computer 110 can determine the intensity of light 305A.

The vehicle computer 110 can further be programmed to compare the intensity of light 305A received by the light sensor 146 with the intensity of light 304 received by the camera 115. In a case that the intensity of light 305A received by the light sensor 146 is less than a threshold, the vehicle computer 110 can determine that the optical window 148 covering the light sensor 146 is obstructed. The threshold may be, for example, a percentage of the intensity of light 304 received by the camera 115, for example, 85%.

Alternatively, a calibration of the light sensor 146 to the camera 115 may be performed and calibration data provided to the vehicle computer 110. For example, in a controlled environment, an external light source 170 may be used to radiate light of different intensities toward the vehicle 105. Data from the camera 115 and the light sensor 146 may be collected for each of these intensities and a table generated from the data.

During an obstruction detection, vehicle computer 110 may receive data specifying a light intensity of an external light source 170 from the camera 115. Based on the data, and the calibration data, the vehicle computer 110 may determine an expected light intensity received by the light sensor 146. In the case that the actual light intensity is less than a threshold, e.g., 85% of the expected light intensity, the vehicle computer 110 may detect an obstruction on the optical window 148.

In another case, the vehicle computer 110 may be programmed to determine whether the optical window 148 is obstructed by comparing an expected intensity of light 305A received by the light sensor 146 with an actual intensity of light 305A. For example, as described above, in reference to block 420, the vehicle computer 110 may be programmed to determine an intensity of light 305 available at the vehicle 105 based on external light sources 170. The vehicle computer 110 may further be programmed to determine an intensity of light 305A received by the light sensor 146 based on the current through the light sensor 146. The vehicle computer 110 may further be programmed to determine whether the intensity of light 305A received by the light sensor 146 is greater than a threshold. The threshold may be a percentage of the intensity of the light 305 expected at the vehicle 105.

In the case that the vehicle computer 110 determines that the intensity of light 305A received by the light sensor 146 is less than the threshold, an obstruction 310 is detected and the process 400 continues in a block 455. In the case that an obstruction 310 is not detected, the process continues in a block 440.

In the block 440, the vehicle computer 110 is programmed to turn on illuminator(s) 144. That is, the illuminators 144 are placed in a mode to emit light 302. The process 400 continues in a block 445.

In the block 445, the vehicle computer 110 is programmed to collect data specifying an intensity of light received respectively by the camera 115 and the light sensor 146. In this case, the intensity of light $L_{camera}$ received by the camera 115 is the sum of the intensity of the light 304 and the intensity of light 302D. The intensity of light $L_{sensor}$ equals the intensity of light 305A (305AO in case of an obstruction) and the intensity of light 302B (302BO in case of an obstruction). The process 400 continues in a block 450.

In the block 450, the vehicle computer 110 is programmed to determine whether an obstruction 310 is present on the optical window 148.

In an example, the vehicle computer 110 may determine that the intensity of the reflected light 302B is less than an expected threshold. The computer may determine the intensity of the reflected light by measuring the current through the light sensor 146. When applicable, the vehicle computer 110 can adjust for any light 305A coming from an external light source 170. The intensity of light 305A is determined as described above with respect to the block 420.

The expected threshold may be based on empirically determined calibration data. For example, tests may be performed on the illuminator module 135 in controlled conditions to determine an expected intensity of light 305A received by the light sensor 146 when the illuminator 144 is activated. The threshold may be set to the expected intensity of light 305A plus a percentage, for example 20%, to allow for variations in production, operating conditions, etc. An intensity of reflected light 302B greater than the threshold may indicate that an obstruction 310 is present.

In another example, the vehicle computer 110 may be programmed to determine whether an intensity of light 302D reflected from object(s) 165 and received by the camera 115 is greater than or equal to a threshold. As described above, the vehicle computer 110 is programmed to identify objects 165 in the environment proximate to the vehicle 105. Based on the objects 165, the vehicle computer 110 may estimate an expected intensity of reflected light 302D received by the camera 115. The intensity of the reflected light 302D received by the camera 115 may, for example, be determined based on neural network systems that use machine learning to compare a current environment proximate to the vehicle 105 with a large number of sample environments, and predict an expected intensity of the reflected light 302D.

The vehicle computer 110 may further be programmed to compare the expected intensity of the reflected light 302D with the measured intensity of the reflected light 302D. A measured light intensity of the reflected light 302D below a threshold may be an indication that the optical window 148 of the illuminator module 135 has an obstruction 310.

Still further, the vehicle computer 110 may be programmed to take into account both the intensity of the reflected light 302B received by the light sensor 146 and the intensity of the reflected light 302D received by the camera 115. For example, the vehicle computer 110 may be programmed to determine that the obstruction 310 is present if either the intensity of the reflected light 302B is above a first threshold, or the intensity of the reflected light 302D is below a second threshold.

As yet another example, the computer 110 may be programmed to determine a threshold for reflected light 302B received by the light sensor 146 based on reflected light 302D (and originating at the illuminator 144) by the camera 115 that indicates an obstruction 310. For example, empirical data obtained under controlled conditions can be used to create a table or the like, that can be stored in the computer 110 memory, specifying an expected intensity of reflected light 302B received by the light sensor 146 from the illuminator 144, based on the intensity of light 302D received by the camera 115. In the case of an obstruction 310, the intensity of light 302B received by the light sensor 146 can increase, the intensity of light 302D received by the camera 115 can decrease. The computer 110 can be programmed to establish a threshold for reflected light 302B based on the table. The computer 110 can find in the table the expected reflected light 302B for a given intensity of light 302D. The computer 110 can then determine a threshold by adding a percentage, for example 10%, to the expected reflected light 302B based on the table. In a case that the intensity of the reflected light 302B exceeds the threshold, the computer 110 can determine that the optical window 148 is obstructed.

In the case that the vehicle computer 110 determines that an obstruction 310 is present on the optical window 148, the process 400 continues in a block 455. Otherwise, the process 400 ends.

In the block 455, the vehicle computer 110 is programmed to activate a cleaning system 152 or the optical window 148. The cleaning system 152 may use air pressure, cleaning fluid, wipers, etc. to remove the obstruction 310 from the optical window 148.

Figure 5:
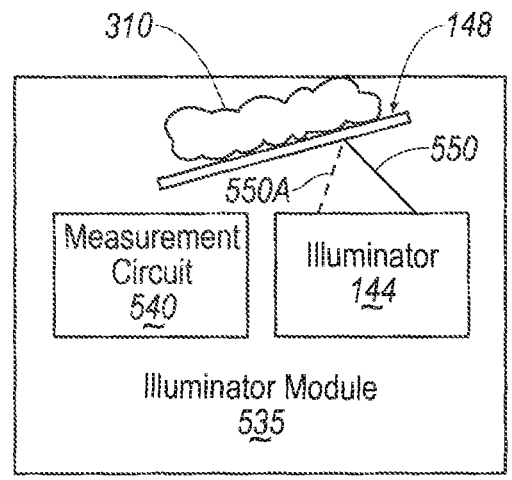
FIG. 5 is a block diagram of an example system for detecting an obstruction on an optical window.

Alternatively, to employing a separate light sensor 146, an intensity of reflected light from the optical window 148 may be determined based on a shift of an IV curve of an illuminator 144. Referring to FIG. 5, an illuminator module 535 includes an illuminator 144, an optical window 148, and a measurement circuit 540. The illuminator 144 may be an LED, as described above. The measurement circuit 540 is configured to measure a current through the illuminator 144 and a voltage across the illuminator 144.

Figure 6:
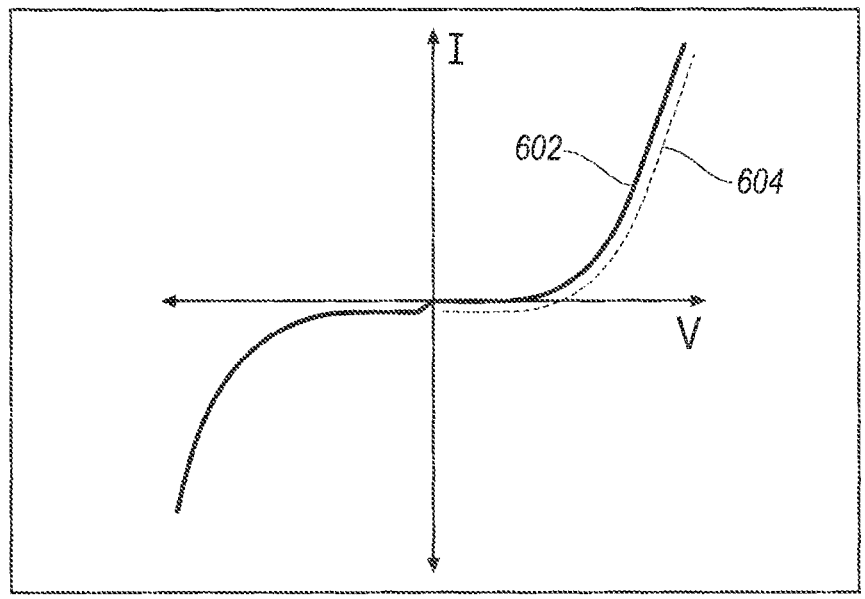
FIG. 6 is a diagram of example current vs. voltage (IV) curves for an illuminator with and without an obstruction on an optical window.

FIG. 6 illustrates first and second IV curves 602, 604 for the illuminator 144. The first IV curve 602 is an example IV curve when there is no obstruction 310 on the optical window 148. In the case that there is an obstruction 310 on the optical window 148, the IV may shift to the second IV curve 604. For a same applied voltage, the current through the illuminator 144 may be reduced.

The computer 144 may be programmed to determine the shift between the first IV curve 602 without an obstruction 310, and the second IV curve 604 and determine that an obstruction 310 is present on the optical window 148. For example, the computer 144 may determine, at the voltage of operation, that the current through the illuminator 144 was reduced by an amount greater than a threshold.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

As used herein, the term "based on" means based on in whole or in part.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, Python, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a Thor-CD, a CD-ROM, LaserDisc, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a NoSQL database, a graph database such as Graph DB, etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
   an optical window;
   an illuminator and a first light sensor deployed on a same side of the optical window;

a second light sensor on another side of the optical window; and a computer including a processor and memory, the memory including instructions such that the processor is programmed to identify an obstruction on the optical window upon the first light sensor reporting first data from the illuminator that is above an expected threshold, the expected threshold based on second data from the second light sensor.

2. The system of claim 1, wherein the processor is further programmed to:

receive third data from the first light sensor when the illuminator is not emitting light; and determine the expected threshold based on the third data.

3. The system of claim 1, wherein the first light sensor is one selected from a group of an LED and a photodiode.

4. The system of claim 1, wherein the second light sensor is a camera.

5. The system of claim 1, wherein the processor is further programmed to:

receive temperature data specifying a temperature of the first light sensor; and adjust the first data based on the temperature data.

6. The system of claim 1, wherein the processor is further programmed to:

receive calibration data from the first light sensor when the optical window is determined not be to be obstructed; and determine the expected threshold based on the calibration data.

7. The system of claim 1, wherein the first light sensor is a photodiode and the first data specifies at least one of a group including a current through the photodiode and a voltage across the photodiode.

8. The system of claim 1, wherein the first light sensor is an LED and the first data specifies at least one of a group including a current through the LED and a voltage across the LED.

9. The system of claim 1, wherein the first light sensor and the illuminator are a same element.

10. The system of claim 9, wherein the processor is further programmed to:

switch the illuminator into a mode to not emit light;

receive third data from the illuminator;

switch the illuminator into a mode to emit light; and receive the first data from the illuminator.

11. A system, comprising:

an optical window on a vehicle;

a light sensor deployed on a first side of the optical window;

a computer including a processor and memory, the memory including instructions such that the processor is programmed to:

determine a threshold based on an estimated intensity of light arriving at a second side of the optical window from a light source; and detect an obstruction on the optical window upon the light sensor reporting first data from the light source that is below the threshold.

12. The system of claim 11, wherein the processor is further programmed to:

estimate the intensity of light arriving based on a type and location of the light source on the second side of the optical window.

13. The system of claim 12, wherein the processor is further programmed to:

determine the type of the light source based on image data received from a sensor on the second side of the optical window.

14. The system of claim 12, wherein the processor is further programmed to:

determine the location of the light source based on image data received from the second side of the optical window.

15. The system of claim 11, wherein the processor is further programmed to:

determine the threshold based on an intensity of light received from a sensor on the second side of the optical window.

16. The system of claim 11, wherein the processor is further programmed to:

activate an illuminator deployed on the first side of the optical window; and detect the obstruction on the optical window upon the light sensor reporting second data that exceeds first data by a second threshold.

17. The system of claim 16, wherein the processor is further programmed to:

determine the second threshold based on an intensity of light received from a sensor on the second side of the optical window.

18. The system of claim 17, wherein the sensor on the second side of the optical window is a camera.

19. The system of claim 16, wherein the processor is further programmed to:

estimate an expected intensity of light received from a sensor on the second side of the optical window based on a type and location of an object proximate to the vehicle; and detect the obstruction on the optical window upon the sensor on the second side of the optical window reporting data below the threshold.

20. The system of claim 11, wherein the first light sensor is a photodiode.

* * * * *